United States Patent [19]

Terunuma et al.

[11] Patent Number: 5,018,832

[45] Date of Patent: May 28, 1991

[54] DEVICE FOR PREVENTING GENERATION OF HARMFUL LIGHT IN OBJECTIVE LENS ASSEMBLY

[75] Inventors: Hiroshi Terunuma, Ichikawa; Daiki Tsukahara, Kawasaki; Akira Katayama, Koganei, all of Japan

[73] Assignee: Nikon Corporation, Tokyo, Japan

[21] Appl. No.: 429,637

[22] Filed: Oct. 31, 1989

[30] Foreign Application Priority Data

Nov. 10, 1988 [JP] Japan .................. 63-146880[U]

[51] Int. Cl.⁵ .................. G02B 7/04; G02B 27/00
[52] U.S. Cl. .................. 350/276 SL; 350/429
[58] Field of Search ............ 350/276 R, 276 SL, 167, 350/429, 451

[56] References Cited

U.S. PATENT DOCUMENTS 4,885,600  12/1989  Iwasa et al. .................. 350/429

*Primary Examiner*—Bruce Y. Arnold
*Assistant Examiner*—Rebecca D. Gass
*Attorney, Agent, or Firm*—Shapiro and Shapiro

[57] ABSTRACT

In an objective lens assembly for an optical instrument comprising inner and outer tube members with outer and inner engaged helicoidal screws, respectively, the normal trapezoidal-section main ridge of the helicoidal screw of the outer tube member is modified to provide one or more wall surfaces that reflect stray light from the object side of the objective lens assembly to prevent such light from reaching the image side of the assembly. The wall surface or surfaces are provided by one or more sub-ridges or grooves at the top of the trapezoidal-section main ridge. Bottom portions between successive elements of the main ridge may be angulated to prevent stray light reflected therefrom from reaching the image end of the assembly.

14 Claims, 4 Drawing Sheets

DEVICE FOR PREVENTING GENERATION OF HARMFUL LIGHT IN OBJECTIVE LENS ASSEMBLY

BACKGROUND OF THE INVENTION

1. Field of the Invention

The present invention relates to a lens assembly for an optical instrument such as a camera. More specifically, the present invention is directed to an improvement in the structure of a helicoidal screw adapted for driving an objective lens in the direction of an optical axis.

2. Related Background Art

In an optical instrument with an objective lens assembly there is often produced the problem of harmful stray light. The stray light generated within the lens tube has various undesirable effects on the performance of the optical instrument.

A typical solution to the problem is to prevent the reflection of light on the inside circumferential surface of the lens tube. For example, in the case of a conventional picture-taking lens assembly comprising a plural lens groups designed for a camera, the inside circumferential surface of the lens tube is usually coated with a light-absorbing black paint. This black coating serves to prevent any scattered stray light from entering the film plane of the camera.

As well-known to those skilled in the art, a lens tube of a conventional camera lens assembly is usually composed of two tubes, namely an inner tube and an outer tube. Lenses are held in the inner tube and moved in a direction along the optical axis for focusing or zooming. To this end, the inner tube is provided with a male helicoidal screw formed on the outside circumferential surface. The male helicoidal screw is in mesh with a female helicoidal screw formed on the inside circumferential surface of the outer tube.

FIG. 1 shows an example of such a structure in a lens assembly for a camera.

Referring to FIG. 1, a lens tube is composed of an inner tube 8 and an outer tube 3. The inner tube 8 holds a lens 7 and has a helicoidal screw 8a formed on its outside circumferential surface. The outer tube 3 has a helicoidal screw 9 formed on its inside circumferential surface. The helicoidal screws 8a and 9 are in mesh with each other to couple the inner tube 8 with the outer tube 3.

The inner tube 8 is allowed to move in an axial direction only and its rotation relative to the camera body 1 is inhibited by stop means not shown.

The outer tube 3 is engaged in a stationary portion 1a of the camera body 1 through a screw 2. The outer tube 3 has also a gear 4 formed on the outside surface of the tube. The gear 4 is rotationally driven by a driving gear 5 which is in turn driven by a motor 6.

When the driving gear 5 is driven into rotation by the motor 6, the outer tube 3 is also rotated through the gear 4. While rotating, the outer tube 3 moves axially in accordance with the pitch of the screw 2. As the result, the inner tube 8 is moved together with the lens 7 linearly along the optical axis to attain focusing.

In the above-shown lens assembly, the problem of harmful stray light arises from the fact that the helicoidal screw 9 formed on the inside surface of the outer tube 3 is exposed to a beam of photo-taking light from the lens 7. As seen in FIG. 1, a portion of the photo-taking light from the lens 7 runs in a direction away from the optical path of the photo-taking light as represented by a beam $A_1$. The off-optical path beam $A_1$ falls on the helicoidal screw 9 and is reflected by it toward a film plane 13. As stray light, the reflected beam $A_2$ enters the film and has an undesirable effect.

The effect of the harmful stray light is larger and more significant when the inner tube 8 is moved out toward the object side. This is because the number of exposed ridges of the helicoidal screw 9 is increased when the inner tube 8 is moved out.

FIG. 2 is a section view of a prior art helicoidal screw showing the conventional form of the screw.

As seen from the figure, the sectional form of the prior art helicoidal screw is trapezoidal. The ridge of the screw has a flattened apex 10. The flat portion 10 tends to reflect the off-optical path beam $A_1$. The reflected light $A_2$ passes through an aperture 12 (FIG. 1) and reaches the image-forming plane or film plane 13. Thus, the reflected light $A_2$ constitutes harmful stray light which degrades the image-forming performance of the lens.

SUMMARY OF THE INVENTION

Accordingly, it is an object of the present invention to provide an objective lens assembly provided with means for preventing the generation of harmful light therein.

It is another object of the present invention to provide an improved structure of helicoidal screw which does not reflect off-optical path rays to the image-forming plane side or to the eye side when the screw is exposed to the optical path.

It is a further object of the present invention to provide a camera in which the generation of harmful light is prevented by employing the above-mentioned structure of a helicoidal screw.

These and other objects, features and advantages of the invention will become more apparent from reading the following description.

According to the present invention, in order to prevent the harmful light, a shading wall surface is provided on the top of the main ridge of the helicoidal screw opposed to the optical path of the photo-taking light. The shading wall surface is formed substantially continuously along the spiral of the screw and is disposed facing the object side of the lens.

The wall surface is inclined to reflect stray light coming from the object side of the lens. The inclination angle of the shading wall surface is so determined that the stray light incident on the wall surface may be reflected in a direction substantially orthogonal to the optical axis or in direction somewhat turned toward the object side.

In an embodiment of the present invention, the shading inclined surface is provided by additionally forming a sub-ridge portion on the top of the main ridge of the helicoidal screw. The sub-ridge portion has a triangular section and is formed along the spiral of the helicoidal screw.

In another embodiment of the invention, the shading inclined surface is provided by engraving a groove in the flat top of the conventional helicoidal screw. The groove is formed substantially continuously along the spiral of the screw and in such manner that no flat portion remains on the top of the screw after engraving.

In a further preferred embodiment, the bottom of the helicoidal screw is inclined relative to the inside circumference parallel to the optical axis and is formed as a conical surface facing the object side and centered on the optical axis or image side.

In the lens tube according to the present invention, it is preferable to form the above-mentioned slant face over all the length of the helicoidal screw. However, it is to be understood that the object of the present invention may be attained, to some extent, by forming such slant face at only a portion of the screw where the harmful stray light is apt to be generated most frequently.

DETAILED DESCRIPTION OF THE PREFERRED EMBODIMENTS

Figure 3:
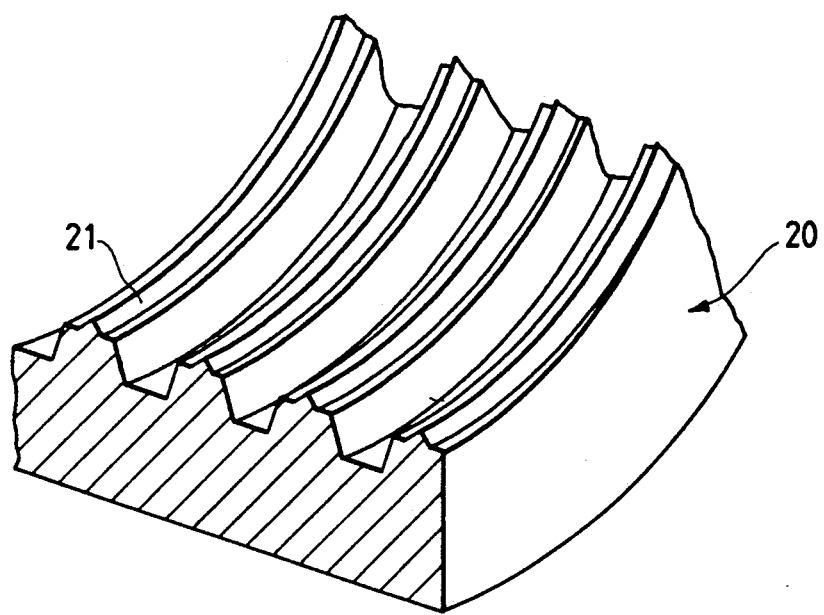
FIG. 3 is an enlarged perspective view of a portion of a helicoidal screw showing a first embodiment of the present invention.
Figure 4:
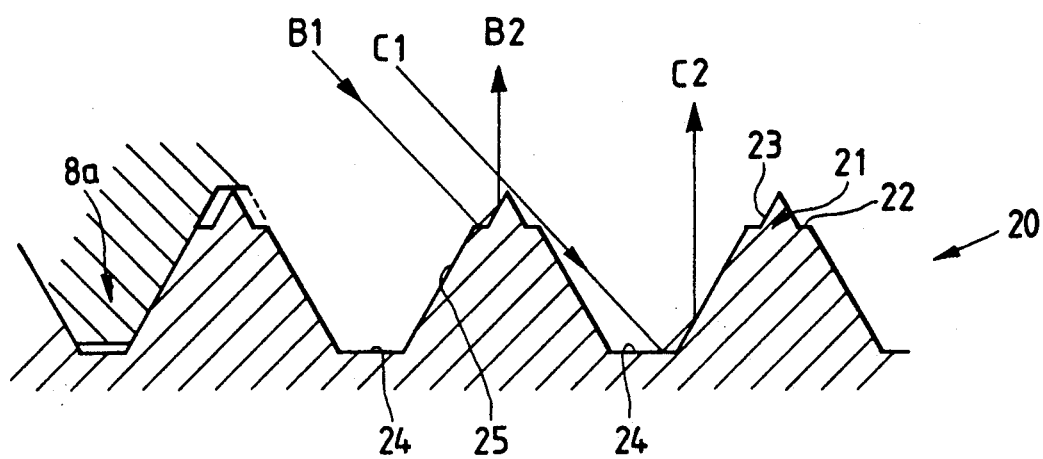
FIG. 4 is an enlarged sectional view of the first embodiment.

A first embodiment of the present invention is shown in FIGS. 3 and 4 as fragmentary enlarged views of a helicoidal screw of a lens tube.

A helicoidal screw is formed on the inside circumferential surface of the lens tube 2. The main ridge of the helicoidal screw has a sub-ridge portion 21 formed on the top of the main ridge along the spiral of the screw. The sub-ridge portion 21 has a triangular form in section. The top of the sub-ridge portion is shaped into a sharp edge.

Figure 1:
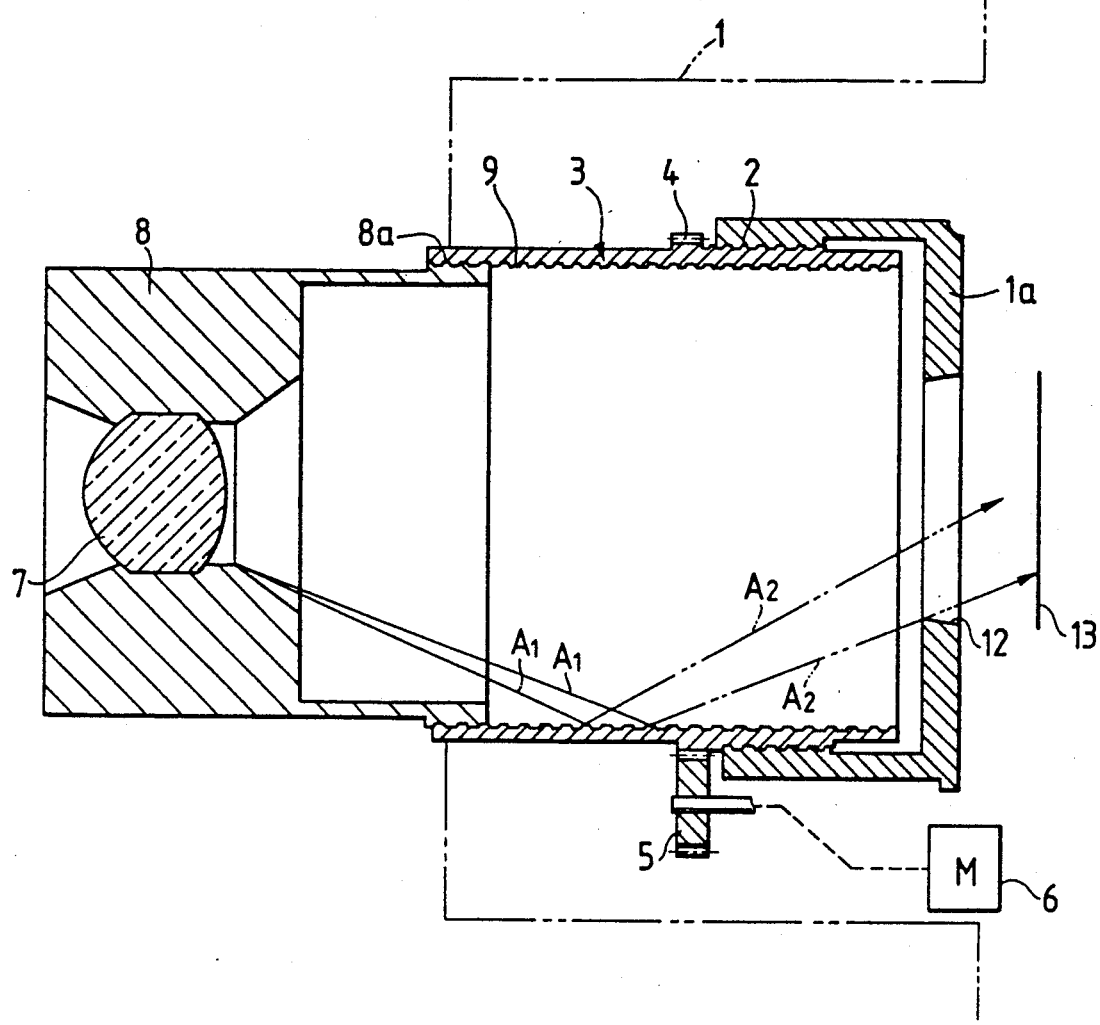
FIG. 1 is a sectional view of a prior art lens assembly for a picture taking camera.

The function of the sub-ridge portion will be seen best from FIG. 4. A light beam $B_1$ coming from a lens 7 (FIG. 1) and running away from the optical path of the lens impinges on the flat top 22 of the main ridge and is reflected by the latter. The reflected light runs first toward the film plane. But, it is then reflected by a slant face 23 of the sub-ridge portion 21. This reflected light beam $B_2$ runs upwardly in the plane of the drawing and does not enter the film plane.

Another off-optical path light beam $C_1$ falls upon the bottom 24 of the screw and is reflected by it. The reflected light is again reflected by a slant face 25 of the main ridge and then runs upwardly as the reflected beam $C_2$ in the plane of the drawing.

It is most desirable to make the reflected light beams $B_2$ and $C_2$ run in a direction normal to the optical axis or in a direction rather inclined toward a object side from the plane normal to the optical axis. However, such direction of reflection is not always necessary for the construction of the present invention. Since, as previously mentioned, the surface of the helicoidal screw is coated with light-absorbing black paint, almost all of the reflected rays $B_2$ and $C_2$ may be absorbed after several reflections within the lens tube. Therefore, the inclination angle of the slant faces 23 and 25 is not critical. The slant faces may also have an inclination angle by which the reflected rays $B_2$ and $C_2$ run in a direction somewhat inclined toward the image side providing that the reflected rays $B_2$ and $C_2$ never run into the film plane directly.

In the shown embodiment, the top end of the sub-ridge portion 21 is shaped into a sharp triangular edge. Though such sharp edge is preferable, the shape of the top end of the sub-ridge portion 21 is not limited to triangular form only. Another form such as semicircular also may be selected for the top end of the sub-ridge portion without reducing the effect for the prevention of harmful light too much.

Referring to FIG. 4, the male helicoidal screw 8a of the inner tube 8 is engaged with the female helicoidal screw of the lens tube 20. The bottom of the male screw 8a is not required to have a particular shape. It may have any conventional form. The thing required for the bottom of the male helicoidal screw 8a is only that it should have a sufficient depth so as not to be touched by the sub-ridge portion 21.

In view of the need to reflect the incident light $C_1$ as described above, the ridge of the screw should be as high as possible. However, in practice, we must take into consideration a case where the height of the ridge of the screw is small for the pitch of the screw.

Figure 5:
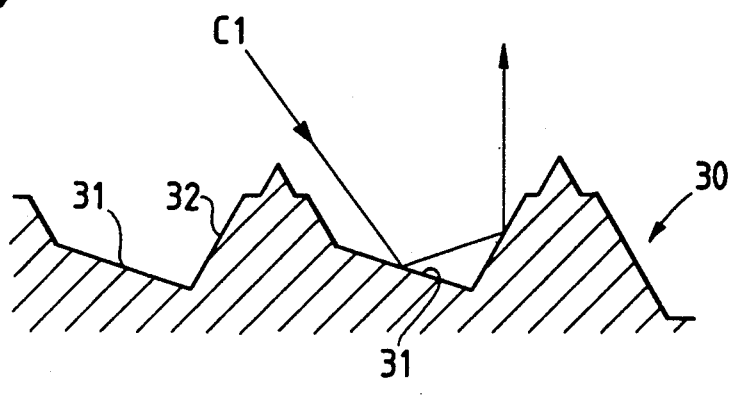
FIGS. 5 and 6 are enlarged fragmentary sectional views showing modifications of the first embodiment.
Figure 6:
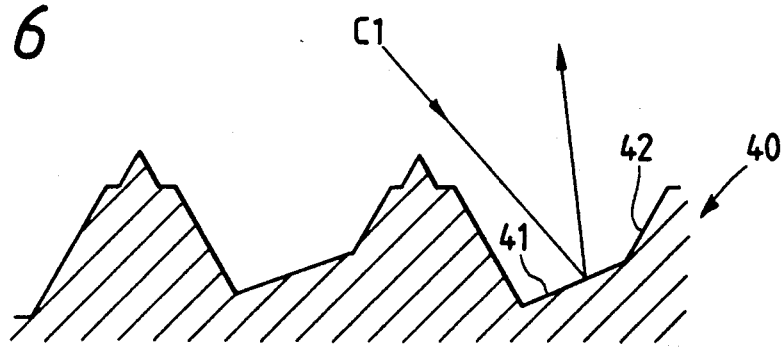

In this case, it is advisable to dispose the bottom of the screw inclined relative to the optical axis as shown in FIGS. 5 and 6.

In a lens tube 30 shown in FIG. 5, which is a modification of the first embodiment, the bottom of the helicoidal screw is formed by an inclined surface facing the image side or view-finder side. The beam $C_1$ falling on the bottom 31 is reflected in a direction of a relatively obtuse angle and impinges upon a slant face 32 of the main ridge. Again, the slant face 32 reflects the beam $C_1$ upwardly in the plane of the drawing.

In a lens tube 40 shown in FIG. 6, which is a second modification of the first embodiment, the bottom 41 of the screw is formed by an inclined surface facing the object side in contrast with the first modification shown in FIG. 5. In this second modification, the incident light $C_1$ is reflected by the bottom 41 not in a direction toward the slant face 42 but in a direction somewhat toward the object side or upwardly in the plane of the drawing.

The first embodiment described above is featured by the sub-ridge portion additionally formed on the flat top of the original ridge of a helicoidal screw.

Figure 7:
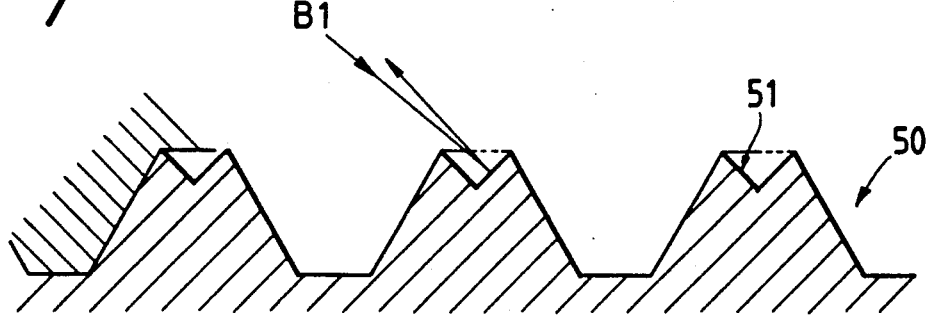
FIG. 7 is an enlarged sectional view of a portion of a helicoidal screw showing a second embodiment of the invention.

A second embodiment of the invention shown in FIG. 7 is featured by a groove formed on the flat top of the original ridge of a helicoidal screw. The groove is formed by cutting out the flat top along the spiral of the screw in such manner that no flat portion is left after engraving.

More specifically, in the lens tube 50 shown in FIG. 7, the helicoidal screw has a groove 51. The groove has a V-shaped cross section. It is formed by cutting out the original flat portion at the top of the ridge of the screw. After engraving the V-shaped groove 51, no original flat portion is left as such.

In this embodiment, the beam of light $B_1$ incident upon the top of the ridge is reflected back by a slant face of the V-shaped groove 51. The direction of reflection can be controlled by suitably selecting the depth of the V-shaped groove 51. Therefore, it is possible to reflect the incident beam $B_1$ in a direction much more deflected toward the object side.

The second embodiment has a particular advantage in that the height of the ridge of the helicoidal screw can be reduced as compared with the first embodiment in which a sub-ridge portion has been formed additionally on the top of the original ridge (main ridge). According to the second embodiment, therefore, one can reduce the size of the total structure of the helicoidal screw without substantially reducing the effect of the present invention for preventing harmful light. Further, this enables to realization a smaller lens tube than the prior art.

FIGS. 8 to 11 illustrate various modifications of the second embodiment.

Figure 8:
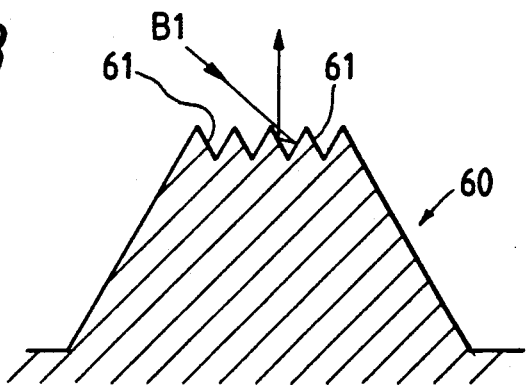
FIGS. 8 to 11 are enlarged fragmentary sectional views showing modified forms of the second embodiment.

In the modification shown in FIG. 8, the helicoidal screw in a lens tube 60 has a plurality of V-shaped grooves 61 formed on the top of the ridge. A beam of incident light $B_1$ is reflected first by a slant face of one of the V-shaped grooves 61 and then reflected by an opposite slant face of the groove. Finally, the beam runs upwardly in the plane of the drawing.

Figure 9:
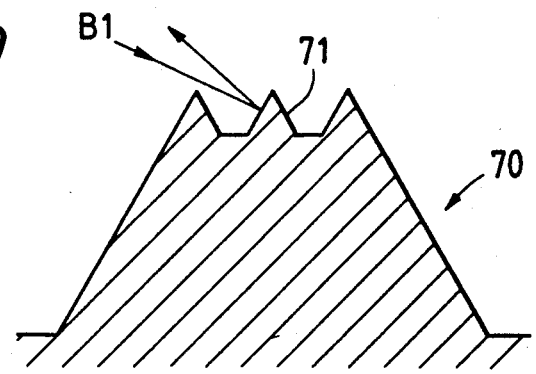

In the second modification shown in FIG. 9, the helicoidal screw in a lens tube 70 also has V-shaped grooves 71. But, the distance between the grooves is longer than that in the first modification. In this second modification, therefore, because of the longer distance between the V-shaped grooves 71, the beam $B_1$ is reflected in the direction toward the object side directly by a slant face of the first groove without being directed to an opposite face of the groove.

Figure 10:
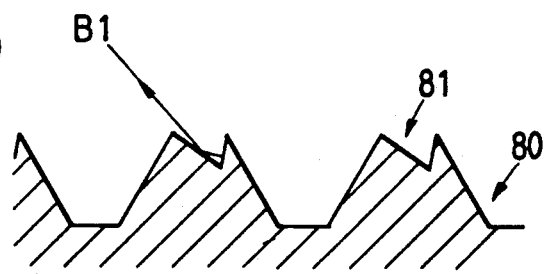
Figure 11:
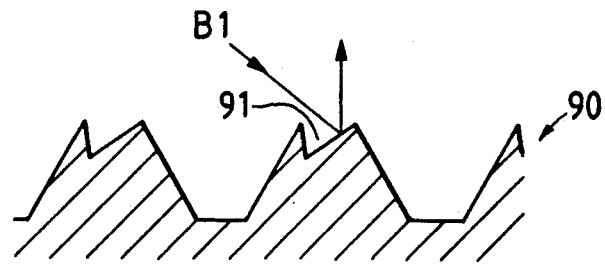

In further modifications shown in FIGS. 10 and 11, each the V-shaped is formed by two slopes having different inclination angles.

More specifically, referring to FIG. 10, each of the V-shaped grooves 81 in the lens tube 80 is formed by two slant faces having different inclinations. The inclination of the slant face on the image side is far sharper than that on the object side. In this modification, the incident beam $B_1$ is reflected three times between the two slant surfaces of the V-shaped groove 81. Finally, the beam $B_1$ runs back toward the object side along approximately the same optical path as the incident beam. During the repeated reflections in the V-shaped groove 81, the incident light $B_1$ is markedly attenuated. Thus, the effect for eliminating harmful light can be further increased by employing this modification.

Referring to FIG. 11, the V-shaped groove 91 in the lens tube 90 also has two differently inclined slopes. But, in this embodiment, the slant face on the image side is more gently sloped than that on the object side so that the incident beam $B_1$ may be reflected upwardly in the plane of the drawing.

In the second embodiment where a plural number of grooves are engraved in the top of the ridge of a helicoidal screw, it is not always necessary to arrange the grooves at a constant pitch along the optical axis. In addition, the grooves may have different sectional shapes from each other. The grooves can be formed in a very simple manner.

Figure 2:
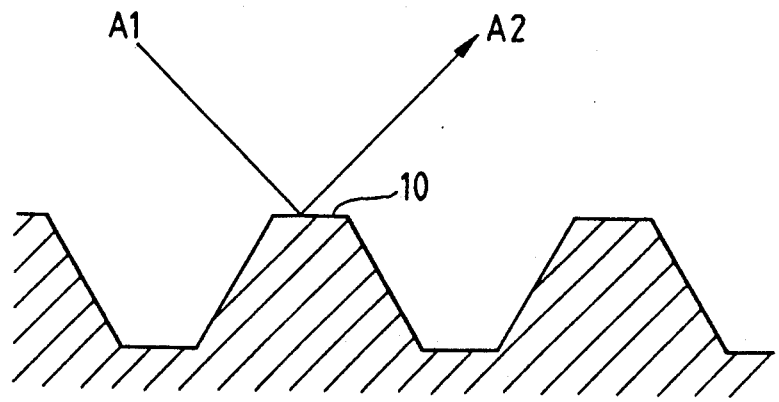
FIG. 2 is an enlarged sectional view of a portion of a prior art helicoidal screw.

For example, man can form such grooves by rotating a lens tube with a helicoidal screw preformed in a conventional shape as shown in FIG. 2 about the optical axis and scratching the flat top surface of the ridge with a rough sand-paper or the like thereby forming a plurality of scratched lines along the spiral of the ridge of the helicoidal screw.

We claim:

1. An objective lines assembly for an optical instrument, comprising:

an inner tube member surrounding an optical axis;
   an outer tube member surrounding said inner tube member;
   a helicoidal screw formed on the outside circumferential surface of said inner tube member;
   a helicoidal screw formed on the inside circumferential surface of said outer tube member and engaged with the helicoidal screw on the inner tube member;
   said helicoidal screws of said inner tube member and said outer tube member having each a main ridge of a trapezoidal form in section, respectively; and
   means for forming a wall surface facing an object side of said objective lens assembly, said wall surface being formed at the top of the trapezoidal-section main ridge of the outer tube member and along the spiral of said screw, said wall surface being angulated relative to said optical axis so as substantially to prevent light incident on said wall surface from said object side of said objective lens assembly from reaching an image side of said objective lens assembly.

2. An objective lens assembly according to claim 1, wherein said wall surface is provided continuously substantially the length of the spiral of said screw.

3. An objective lens assembly according to claim 1, wherein said means for forming a wall surface comprises a sub-ridge portion formed along the spiral of said screw and on the top of the main ridge of the helicoidal screw on said outer tube member, and a side surface of said sub-ridge portion constitutes the wall surface.

4. An objective lens assembly according to claim 3, wherein said sub-ridge portion has a triangular form in section and has a ridge-line along the spiral of said screw.

5. An objective lens assembly according to claim 1, wherein said means for forming a wall surface comprises a plurality of sub-ridge portions formed in parallel with each other along the spiral of said screw and on the top of the main ridge of the helicoidal screw on said outer tube member, and side surfaces of the respective sub-ridge portions constitute the wall surface.

6. An objective lens assembly according to claim 1, wherein a bottom portion of the helicoidal screw on said outer tube member is formed by a conical surface centered on the optical axis.

7. An objective lens assembly according to claim 1, wherein said means for forming a wall surface comprises at least one groove formed in the top of the main ridge of the helicoidal screw of said outer tube member and along a spiral of said screw, and the side surface of the groove constitutes the wall surface.

8. An objective lens assembly according to claim 7, wherein said at least one groove is formed by cutting out a flat top of the main ridge of said helicoidal screw in such manner that no flat portion remains on the top of the main ridge.

9. An objective lens assembly according to claim 7, wherein said at least one groove has a substantially V-shaped sectional form.

10. An objective lens assembly according to claim 1, wherein said means for forming a wall surface comprises a plurality of grooves formed in the top of the main ridge of the helicoidal screw of said outer tube member and along the spiral of said screw, and side surfaces of the grooves constitute the wall surfaces respectively.

11. A lens assembly for a camera with a picture-taking lens system for forming an image of an object on an image-forming plane comprising:
- an inner tube member surrounding an optical axis;
- an outer tube member surrounding said inner tube member;
- a helicoidal screw formed on the outside circumferential surface of said inner tube member;
- a helicoidal screw formed on the inside circumferential surface of said outer tube member and engaged with the helicoidal screw on the inner tube member, said helicoidal screws of the outer tube member being partly exposed to a picture-taking optical path extending between the picture-taking lens system and the image-forming plane when the inner tube member is moved relatively to the outer tube member, and each of said helicoidal screws of the inner and outer tube members has a main ridge which is approximately trapezoidal in section; and
- shade means providing a wall surface at the top of the approximately trapezoidal-section main ridge of the helicoidal screw of the outer tube member, said wall surface being angulated relative to the optical axis so as substantially to prevent light incident thereon from the picture-taking lens system from reaching the image-forming plane.

12. A lens assembly according to claim 11, wherein said wall surface is formed continuously and over substantially the length of the spiral of said screw.

13. A lens assembly according to claim 11, wherein said wall surface is a surface of a sub-ridge portion on top of said main ridge.

14. A lens assembly according to claim 11, wherein said wall surface is a surface of a groove in the top of said main ridge.

* * * * *